(12) United States Patent
Mitchell

(10) Patent No.: US 11,551,014 B1
(45) Date of Patent: Jan. 10, 2023

(54) DEVICE, SYSTEM, AND METHOD FOR CARD SKIMMING PROTECTION

(71) Applicant: NCR Corporation, Atlanta, GA (US)

(72) Inventor: Graeme Mitchell, Dundee (GB)

(73) Assignee: NCR Corporation, Atlanta, GA (US)

( * ) Notice: Subject to any disclaimer, the term of this patent is extended or adjusted under 35 U.S.C. 154(b) by 21 days.

(21) Appl. No.: 17/361,801

(22) Filed: Jun. 29, 2021

(51) Int. Cl.
*G06K 7/00* (2006.01)

(52) U.S. Cl.
CPC .................. *G06K 7/0056* (2013.01)

(58) Field of Classification Search
CPC ....................................................... G06K 7/0056
See application file for complete search history.

(56) References Cited

U.S. PATENT DOCUMENTS

| 10,410,022 | B2* | 9/2019 | Akahane | G06K 7/10 |
| 10,977,453 | B2* | 4/2021 | Momose | G06K 7/0008 |
| 2017/0061167 | A1* | 3/2017 | McNicoll | G06K 13/0875 |
| 2019/0163938 | A1* | 5/2019 | Kitazawa | G06K 7/087 |
| 2020/0126368 | A1* | 4/2020 | Ozawa | G06K 7/081 |

\* cited by examiner

*Primary Examiner* — Seung H Lee
(74) *Attorney, Agent, or Firm* — Schwegman, Lundberg & Woessner

(57) ABSTRACT

A card reader's motorized transport is controlled by firmware of the reader so as to control a distance that any card can be pulled into the reader during a transaction on a host device. The distance is sufficient enough to allow an embedded chip on the card to be read by a chip read interface but is insufficient to be read by a magnetic read interface. Furthermore, the entire length of the card is prevented from completely passing over the magnetic read interface during the transaction such that any skimmer placed within the reader is physically unable to read the magnetic card information from the magnetic strip of the card. In an embodiment, the firmware is configured to permit only chips from the cards to be read for transactions or configured to turn off chip only reading by permitting both chip reads and magnetic strip reads for each transaction.

20 Claims, 4 Drawing Sheets

DEVICE, SYSTEM, AND METHOD FOR CARD SKIMMING PROTECTION

BACKGROUND

Payment card skimmers are a substantial problem in the industry especially since more and more transaction terminals are self-service where the customer inserts performs the transaction and inserts a payment card for self-pay to complete the transaction.

Typically, the point of having a Self-Service Terminal (SST) is to reduce staffing requirements of a business and speed up checkouts of customers through the business. Moreover, a single employee is often responsible for assisting or monitoring all of a businesses SSTs. As a result, employees do not continuously monitor these terminals for the presence of skimmers and in many environments it would be infeasible to do so, such as outside Automated Teller Machines (ATMs), fuel pumps, and kiosks used for a variety of products (such as movie rentals, food and beverage, etc.).

A skimmer is a very thin and small electronic device that is inserted by a thief into the card slot of a card reader for the SST. The skimmer is designed align with a read head of a magnetic read interface for the card reader. To successfully steal the card information, the skimmer needs to have the card's magnetic strip pass completely over the skimmer's magnetic read interface.

Most attempts to thwart skimmers have been directed to adding hardware or rearranging the electromechanical components of the card reader itself. But this is expensive and labor intensive requiring each existing card reader of each SST to be swapped out with a redesigned or updated card reader. Furthermore, most hardware-based solutions have been directed to adding sensors into the path of the card transport of the card readers. When a transaction is not being performed at the terminal if the sensor reports the presence of an obstruction, this is a pretty good indication that a skimmer is present, and the card reader is disabled on the SST. However, thieves have just redesigned the layout and size of their skimmers so as to avoid the locations within the card reader of the sensors, which renders the hardware redesign for the reader useless.

Additionally, many chip-based card readers are still designed to also read the card's magnetic strip. When a card is inserted into these readers, the card transport is motorized and prevents the customer from fully inserting the card. The motorized transport then controls the movement of the card within the reader and moves the card back all the way into the reader for purposes of first reading the cards magnetic strip, then the card is partially forced back towards the slot opening of the reader and positioned over the reader's chip read interface. Once the chip information is read, the transport releases its grip on the card and instructs the customer to remove the card from the slot of the card is forced back through the slot for the customer to grab and remove.

As a result, many chip-based card readers still read magnetic information on the card even when the transaction itself relies on card information read from the card's chip. Consequently, thieves are still stealing card information from SSTs that primarily or exclusively rely on reading card information from the card's embedded chip.

SUMMARY

In various embodiments, a device, a system, and a method for card skimming protection are presented.

According to an aspect, a card reader having card skimming protection is presented. The card reader comprises a shutter, a motorized card transport, a magnetic read interface, a chip read interface, a processor, and a non-transitory computer-readable storage medium. The medium comprises firmware executable instructions. The firmware executable instructions when executed by the processor from the non-transitory computer-readable storage medium cause the processor to perform operations comprising detecting a card presented at the shutter; identifying a mode of operation for the card reader; and when the mode of operation corresponds to a skimmer protection mode of operation: controlling the motorized card transport to draw a leading edge of the card within the card reader to a distance sufficient to be read by the chip read interface but insufficient to be read by the magnetic read interface.

DETAILED DESCRIPTION

Figure 1A:
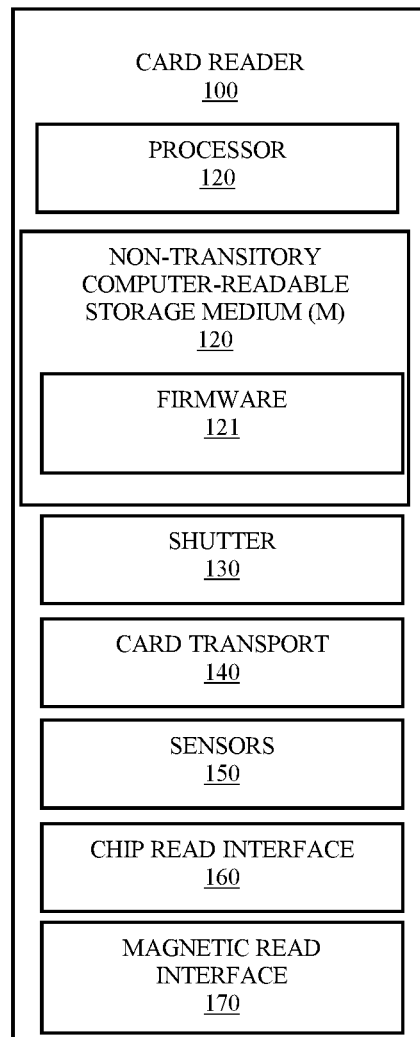
FIG. 1A is a diagram of a card reader with skimming protection, according to an example embodiment.

FIG. 1A is a diagram of a card reader 100 having skimming protection, according to an example embodiment. It is to be noted that the components are shown schematically in greatly simplified form, with only those components relevant to understanding of the embodiments being illustrated.

Furthermore, the various components (that are identified in FIG. 1A) are illustrated and the arrangement of the components is presented for purposes of illustration only. It is to be noted that other arrangements with more or less components are possible without departing from the teachings of card reader skimmer protection presented herein and below.

As will be discussed in the various embodiments that follow, the teachings provide a new mode of operation for chip-enabled card readers that prevent card reader 100 from being physically capable of reading the magnetic strip information off a card. The new mode of operation can be set within an application of a host device, communicated via a device driver for card reader 100, and enforced by firmware 121 of reader 100.

During the new mode of operation, the firmware 121 controls card transport 140 to prevent the card's magnetic strip from completely passing over the magnetic read interface 170 of reader 100. The transport 140 gains control of a card when inserted through shutter 130, such that the user cannot forcibly push the card all the way into reader 100. Firmware 121 controls transport 140 to move the card's chip over the chip read interface 160 of reader 100. Chip read interface 160 is situated in front of magnetic read interface 170, such that the magnetic strip on the card is never able to completely pass over magnetic read interface 170. Any skimmer inserted into the reader's card path intake through shutter 130 cannot read the strip either because of sensors 150 and because the magnetic strip of the card is never allowed to fully travel a distance within reader 100 to pass completely over the magnetic read interface 170; rather the card transport 140, which is controlled by firmware 121, ensures that the card is only inserted far enough to have the card's chip engage or align with chip read interface 160. Because the magnetic strip on the card never completely passes over the magnetic read interface 170, a skimmer cannot physically read the magnetic information encoded on the strip because of the locations of the magnetic read interface 170 and the sensors prevent configurations of a skimmer to be able to capture the entire strip of the card. As stated above, a successful read of the magnetic information off the card requires that the strip completely pass in its entirety over magnetic read interface 170 or a magnetic read interface of a skimmer placed in reader 100.

Furthermore, the teachings presented herein require no hardware changes or modifications and require no changes in the existing layout of the electromechanical components of reader 100 (achieved without modification to the hardware and layout of the electromechanical components). Thus, reader 100 is an enhancement to an existing card reader that modifies only firmware 121 to prevent magnetic card information from being read off a card's magnetic strip during a transaction at a host device. The enhancement can be achieved via an update to an existing reader's firmware, which may be achieved remotely via a network connection to the host, achieved at the host by transferring firmware 121 from a source location to medium 120 of reader 100, or achieved via a device driver on the host for reader 100.

Card reader 100 comprises a processor 120, a non-transitory computer-readable storage medium 120, a shutter 130, a card transport 140, one or more sensors 150, a chip read interface 160, and a magnetic read interface 170. The medium 120 comprises executable instructions for firmware 121.

Figure 1B:
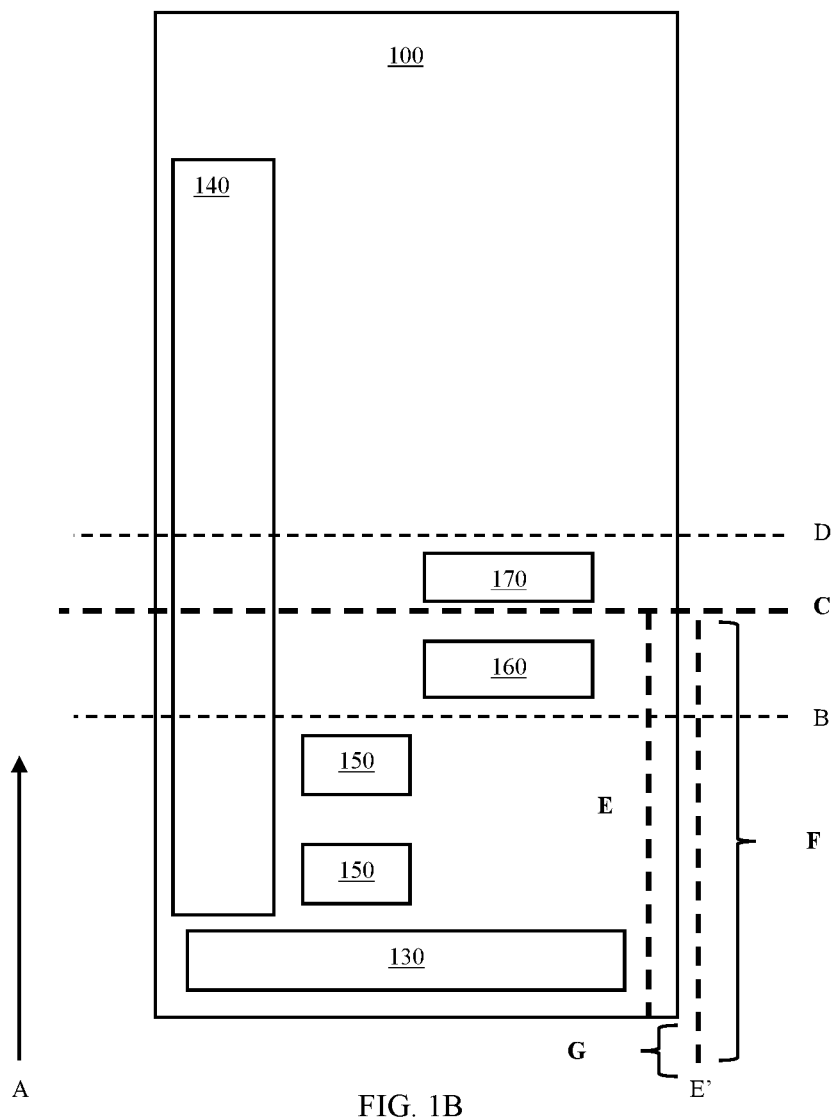
FIG. 1B is a diagram of an example layout of electromechanical components of a card reader having skimming protection, according to an example embodiment.

FIG. 1B illustrates an example physical layout of electromechanical components of card reader 100.

Card intake for a transaction is activated through shutter 130, the direction of the card path is illustrated by arrow A in FIG. 1B. Transport 140 grabs control of the leading edge of the card inserted through shutter 130. A leading edge of the card passes over one or more sensors 150 upon entry.

It is to be noted that sensors 150 are not necessary and are not required with the teachings presented herein. However, if sensors 150 were present in an existing reader that was updated with firmware 121, then skimmer detection through uses of sensors 150 may operated in the manner that they would normally operated.

When firmware 121 detects that a host device has set the reader 100 to be in a "skimmer protection" mode of operation or a "no magnetic read" mode of operation, firmware 121 controls transport 140 to ensure that no magnetic read of the cards strip is possible.

Broken line B in FIG. 1B is intended to illustrate the trailing edge location of any skimmer that may have been inserted into reader 100 by a thief. The trailing edge of the skimmer' read head has to be past sensors 150 (when present in reader 100) so that the skimmer can go undetected during non-transaction periods of the host. This location of the trailing edge of a skimmer will not save the skimmer from being unable to read the magnetic strip of the card because the full length of the card never passes completely over point B when firmware 121 is in a skimmer protection mode of operation.

Broken and bolded line C in FIG. 1B is intended to illustrate the farthest point for the leading edge of a card reached within reader 100 when firmware 121 is in the skimmer protection mode of operation. This point C is far enough to allow chip read interface 160 to engage the card's chip and read the card information from the chip for the transaction at the host but not far enough to reach magnetic read interface 170 and therefore not far enough for any skimmer's read interface to read the magnetic card information on the card. In fact, because the magnetic strip on the card is never fully dipped or inserted into reader 100, the card information from the strip cannot be read by any magnetic read interface 170 or one that would be present on a skimmer.

Broken line D in FIG. 1B is intended to illustrate the trailing edge of a card dipped or inserted into a reader without firmware 121 or with firmware 121 when firmware 121 is not in the skimmer protection mode of operation. Notices that the trailing edge of the card passes completely over magnetic reader 170, which is necessary when reading the magnetic encoded card information from the strip is desired. Notice also that point D would permit a skimmer to read the magnetic card information from the strip.

Broken and bolded line E in FIG. 1B is intended to illustrate a length of a card that may be inserted into reader 100 when the reader is in the skimmer protection mode of operation. Notice that the full length of the card is moved inside reader 100 past the shutter for the opening of the reader 100. However, the distance the card is moved insider reader is insufficient to permit its trailing edge (portion located just inside the shutter opening) to pass over read interface 170 (pass over point C), which means any skimmer's read head in unable to read the card's magnetic strip.

In another embodiment, broken and bolded line E' in FIG. 1B is intended to illustrate a length of a card for which the entire length of the card is not fully drawn into reader 100 behind the shutter opening. Notice, in this embodiment, that length G is a portion of the card that remains outside of reader 100 extended beyond the opening associated with shutter 130. Length F of the card is pulled within reader 100 to point C, such that a distance that the card is within reader 100 is sufficient enough to be read by chip read interface 160 but insufficient in distance and length to have the magnetic strip of the card fully inserted into reader 100 (because the full length of the card (or trailing edge of the card) never passes beyond point C which is needed for a skimmer's read head to read the card strip and necessary for magnetic read interface 170 to read the card strip). Thus, distance F or the portion of the card corresponding with F ensures that the strip cannot be read by magnetic read interface 170 or any skimmer that may have been placed within reader 100.

Firmware 121, when in the skimmer protection mode of operation, controls transport 140 to stop a customer from forcing the card into reader 100 and activates transport 140 to urge the leading edge of the card to point C, such that a least a portion of a trailing edge of the card never passes over the magnetic read interface 170 and in some embodiments remains outside reader 100 (extends outside reader 100 from shutter 130). Thus, the full and complete magnetic strip of the card does not fully and completely pass over interface 170, such that is not physically possible for magnetic read interface 170 or any skimmer magnetic read interface to read the card information from the strip. The chip information from the card is read and processed in a normal manner and the grip of transport 140 is released and the customer instructed to remove the card by the host.

Figure 1C:
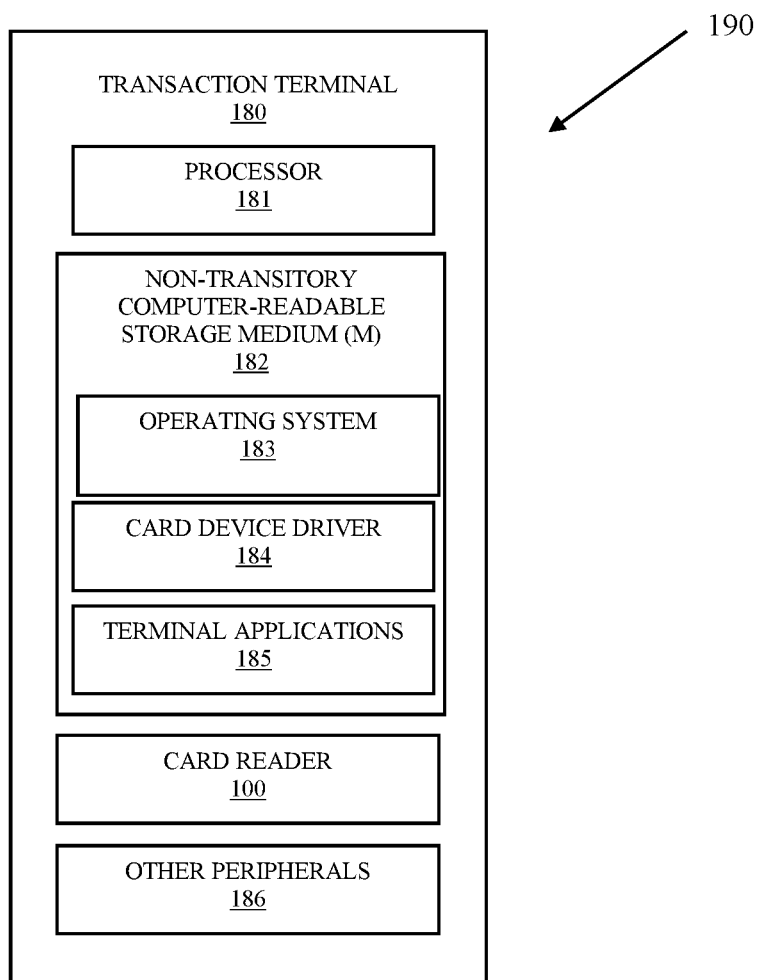
FIG. 1C is a diagram of a system for skimming protection, according to an example embodiment.

FIG. 1C is a diagram of a system 190 for skimming protection, according to an example embodiment. Again, the components are shown schematically in greatly simplified form, with only those components relevant to understanding of the embodiments being illustrated.

System 190 illustrates a host for card reader 100 that is a transaction terminal 180, such as an Automated Teller Machine (ATM), a SST, a Point-Of-Sale (POS) terminal, or a kiosk.

System 190 comprises a processor 181, a non-transitory computer-readable storage medium 182, card reader 100, and, optionally, one or more other peripherals (e.g., media depository, touch display, scanner, camera, Personal Identification Number (PIN) pad, encrypted PIN pad, keyboard, weigh scale, combined scanner and weigh scale, receipt printer, etc.).

Medium 182 comprises an Operating System (OS) 183, a card device driver 184, and one or more terminal applications 185.

OS 183 is loaded during power up or boot of terminal 180 into memory and provides a processing environment (context) in which driver 184 and applications 185 are processed/executed by processor 181 of terminal 180. OS 183 loads driver 184 to provide an interface between applications 185 and firmware 121 of reader 100.

Device driver 184 is enhanced to provide an administrative option or setting for a reader interface associated with firmware 121 to applications 185. This option permits reader 100 to be operated in the skimmer protection mode of operation as discussed above. When selected by a user through an application 185, driver 184 instructs firmware 121 to operated in the skimmer protection mode of operation. When deselected, driver 184 instructs firmware 121 to perform magnetic reads of card strips using magnetic read interface 170.

In an embodiment, an application 185 associated with an interface or interacting with driver 184 is enhanced to present the administrative option or setting to a user for communicating to driver 184 and by driver 184 to firmware 121. The option can be selected and deselected for turning the skimmer protection mode of operation on and off by the user.

A business can decide whether to force transactions to be chip card read only using the skimmer protection mode of operation for reader 100 or whether the business wants to provided both chip card reads and magnetic card reads for each transaction by turning off or never turning on the skimmer protection mode of operation.

Moreover, and as stated above, an existing reader can be enhanced as reader 100 by updating the existing firmware with firmware 121, updating the existing card device driver with card device driver 184, and updating existing user-level applications that access settings for reader 100 with user-level applications 185. Thus, the benefits of skimmer protection can be fully integrated merely through updates and without requiring any hardware changes or any architectural layout changes to the hardware for reader 100.

In an embodiment, firmware 121 is also configured to perform a variety of other operations. For example, firmware 121 can read the chip on the card and provide the card and chip information for a transaction on terminal 180. Firmware 120 can read magnetic strip card information from the strip of the card when firmware identifies a setting that has the skimmer protection mode of operation turned off. Firmware 121 can control motorized card transport 140 based on an instruction received or an event to urge the card along transport 140 onto another transport or a bin associated with card reader 100 or terminal 180. Firmware 121 can shut down card reader 100 based on an instruction or an event during a transaction on terminal 180. In fact, any other operation that existing firmware associated with an existing card reader can be performed by enhanced firmware 121 and enhanced card reader 100, such that those operations remain unchanged but enhanced firmware 121 and enhanced reader 100 also provided the skimmer protection mode of operation as discussed herein.

The above-referenced embodiments and other embodiments are now discussed with reference to FIG. 2.

Figure 2:
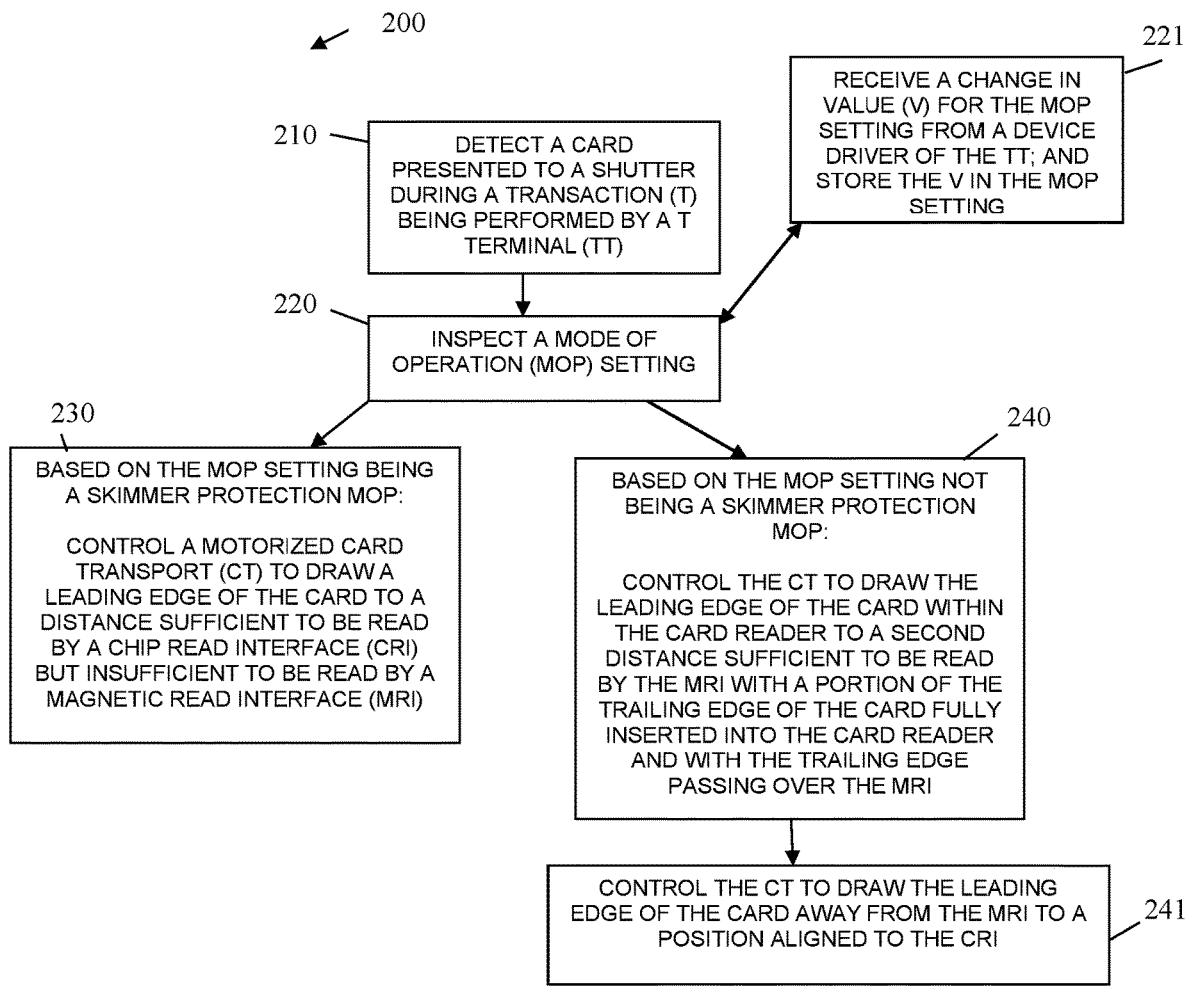
FIG. 2 is a diagram of a method for operating a card reader having skimming protection, according to an example embodiment.

FIG. 2 is a diagram of a method 200 for operating a card reader 100 having skimming protection, according to an example embodiment. The software module(s) that implements the method 200 is referred to as "firmware." The firmware is implemented as executable instructions programmed and residing within memory and/or a non-transitory computer-readable (processor-readable) storage medium and executed by one or more processors of reader 100. The processor(s) of the device that executes the firmware are specifically configured and programmed to process the firmware. The firmware may or may not have access to one or more network connections during its processing. Any network connections can be wired, wireless, or a combination of wired and wireless.

In an embodiment, the firmware is firmware 121 discussed above.

In an embodiment, the firmware performs the skimmer protection mode of operation processing discussed above with reader 100 and system 190 for purposes of preventing card transactions at terminal 180 from being able to be physically read card information from a magnetic strip of a card by magnetic read interface 170 and also preventing any skimmer from reading the card's strip.

At 210, the firmware detects a card presented to a shutter of the card reader during a transaction being performed at a transaction terminal.

At 220, the firmware inspects a mode of operation setting for a value.

In an embodiment, at 221, the firmware receives a change in the value from a device driver of the transaction terminal and stores the value in the mode of operation setting.

When the value of the mode of operation setting corresponds to a skimmer protection mode of operation, at 230, the firmware controls a motorized card transport of the card reader to draw a leading edge within the card reader to a distance sufficient to be read by a chip read interface of the card reader but insufficient to be read by a magnetic read interface. In an embodiment, a portion of a trailing edge of the card remains outside the card reader and extends beyond a location associated with the shutter.

When the value for the mode of operation setting does not correspond to the skimmer protection mode of operation, at 240, the firmware controls the motorized card transport of the card reader to draw the leading edge of the card within the card reader to a second distance sufficient to be read by the magnetic read interface with a portion of the trailing edge of the card fully inserted into the card reader and the trailing edge of the card passing over the magnetic read interface.

In an embodiment of 240 and at 241, the firmware further controls the motorized card transport to draw the leading edge of the card away from the magnetic read interface to a position aligned with the chip read interface. In an embodiment, the portion of the trailing edge for the card remains outside the card reader and extends beyond the location associated with the shutter.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A card reader, comprising:
   a shutter;
   a motorized card transport;
   a magnetic read interface;
   a chip read interface;
   a processor;
   a non-transitory computer-readable storage medium comprising firmware executable instructions; and
   the firmware executable instructions when executed by the processor from the non-transitory computer-readable storage medium cause the processor to perform operations comprising:
      detecting a card presented at the shutter;
      identifying a mode of operation for the card reader; and
      when the mode of operation corresponds to a skimmer protection mode of operation:
         controlling the motorized card transport to draw a leading edge of the card within the card reader to a distance sufficient to be read by the chip read interface but insufficient to be read by the magnetic read interface.

2. The card reader of claim 1 further comprising, one or more sensors situated within the card reader adjacent to the location associated with the shutter.

3. The card reader of claim 1, wherein the firmware executable instructions associated with the detecting further cause the processor to perform additional operations comprising:
   preventing the motorized card transport from allowing the leading edge of the card to be manually forced into the card reader by user operating a host device and performing a transaction at the host device.

4. The card reader of claim 1, wherein the firmware executable instructions associated with the identifying further cause the processor to perform additional operations comprising:
   receiving a setting associated with the mode of operation from a device driver of a host device.

5. The card reader of claim 1, firmware executable instructions associated with the controlling further cause the processor to perform additional operations comprising:
   preventing the motorized card transport from allowing the leading edge of the card to be manually forced into the card reader beyond the distance by user operating a host device and performing a transaction at the host device.

6. The card reader of claim 1, wherein the firmware executable instructions when executed by the processor from the non-transitory computer-readable storage medium further cause the processor to perform additional operations comprising:
   when the mode of operation does not correspond to the skimmer protection mode of operation:
      controlling the motorized card transport to draw the leading edge of the card within the card reader to a second distance sufficient to be read by the magnetic read interface with a portion of the trailing edge of the card fully inserted into the card reader and with the trailing edge passing over the magnetic read interface.

7. The card reader of claim 6, wherein the firmware executable instructions associated with the controlling further cause the processor to perform additional operations comprising:
   after the trailing edge passes over the magnetic read interface:
      controlling the motorized card transport to draw the leading edge of the card away from the magnetic read interface to a position aligned to the chip read interface.

8. The card reader of claim 1, wherein the firmware executable instructions when executed by the processor from the non-transitory computer-readable storage medium further cause the processor to perform additional operations comprising:
   identifying an instruction or an event to shut down the card reader; and
   disabling the card reader with the shutter remaining closed.

9. The card reader of claim 1, wherein the firmware executable instructions when executed by the processor from the non-transitory computer-readable storage medium further cause the processor to perform additional operations comprising:
   identifying an instruction or an event to shut down confiscate the card; and
   controlling the motorized transport to urge the card onto a second transport or into a bin associated with the card reader or associated with a host device performing a transaction with the card.

10. A system, comprising:
    a transaction terminal;
    a card reader;
    the transaction terminal comprises a terminal processor and a terminal non-transitory computer-readable storage medium;
    the terminal non-transitory computer-readable storage medium comprises executable instructions;
    the executable instructions when executed by the terminal processor from the terminal non-transitory computer-readable storage medium cause the terminal processor to perform first operations comprising:
       presenting a skimmer protection mode of operation within an administrative interface to a user; and providing a selected skimmer protection option provided by the user from the administrative interface to firmware executable instructions of the card reader;

the card reader comprises a processor and a non-transitory computer-readable storage medium;

the non-transitory computer-readable storage medium comprises the firmware executable instructions;

the firmware executable instructions when executed by the processor from the non-transitory computer-readable storage medium cause the processor to perform second operations comprising:

storing the selected skimmer protection option in a setting;

detecting a card presented to a shutter of the card reader during a transaction being performed on the transaction terminal; and based on the setting being the skimmer protection option:

controlling a motorized card transport of the card reader to draw a leading edge of the card within the card reader to a distance sufficient to be read by a chip read interface of the card reader but insufficient to be read by a magnetic read interface of the card reader.

11. The system of claim 10, wherein the transaction terminal is an Automated Teller Machine (ATM), a Self-Service Terminal (SST), a Point-Of-Sale (POS) terminal, or a kiosk.

12. The system of claim 10, wherein the executable instructions associated with the presenting are performed by a user-level application that processes within an Operating System (OS) of the transaction terminal.

13. The system of claim 10, wherein the executable instructions associated with the providing are performed by a device driver of the card reader that is controlled by the OS, wherein the device driver translates the selected skimmer protection option into an instruction recognized by the firmware executable instructions associated with changing a value for the setting.

14. The system of claim 10, wherein the executable instructions when executed by the terminal processor from the terminal non-transitory computer-readable storage medium further cause the terminal processor to perform additional operations comprising:

identifying the administrative interface that the user has deselected the skimmer protection option; and providing a deselected skimmer protection option to the firmware executable instructions of the card reader.

15. The system of claim 14, wherein the firmware executable instructions when executed by the processor from the non-transitory computer-readable storage medium further cause the processor to perform third operations comprising:

storing the deselected skimmer protection option in the setting;

detecting a second card presented to the shutter of the card reader during a second transaction being performed on the transaction terminal; and based on the setting being the deselected skimmer protection option:

controlling the motorized card transport to draw the leading edge of the second card within the card reader to a second distance sufficient to be read by the magnetic read interface with a portion of the trailing edge of the second card fully inserted into the card reader and with the trailing edge passing over the magnetic read interface.

16. The system of claim 15, wherein the firmware executable instructions associated with the controlling when the setting is the deselected skimmer protection option further cause the processor to perform additional operations comprising:

controlling the motorized card transport to draw the leading edge of the second card away from the magnetic read interface to a position aligned to the chip read interface of the card reader.

17. A method, comprising:

detecting, by a card reader of a host device, a card presented to a shutter during a transaction being performed by the host device;

inspecting, by the card reader, a mode of operation setting;

based on the mode of operation setting being a skimmer protection mode of operation:

controlling, by the card reader, a motorized card transport of the card reader to draw a leading edge of the card within the card reader to a distance sufficient to be read by a chip read interface of the card reader but insufficient to be read by a magnetic read interface of the card reader.

18. The method of claim 17, wherein based on the mode of operation setting not being the skimmer protection mode of operation:

controlling, by the card reader, the motorized card transport to draw the leading edge of the card within the card reader to a second distance sufficient to be read by the magnetic read interface with a portion of the trailing edge of the card fully inserted into the card reader and with the trailing edge passing over the magnetic read interface.

19. The method of claim 18, wherein based on the mode of operation setting not being the skimmer protection mode of operation:

controlling, by the card reader, the motorized card transport to draw the leading edge of the card away from the magnetic read interface to a position aligned to the chip read interface of the card reader.

20. The method of claim 17, wherein inspecting further includes:

receiving a change in a value for the mode of operation setting from a device driver of the host device, and storing the value in the mode of operation setting.

* * * * *